United States Patent [19]

Watts

[11] Patent Number: 4,562,634

[45] Date of Patent: Jan. 7, 1986

[54] METHOD OF COVERING SURFACES WITH TENSILE SHEET MATERIALS

[76] Inventor: Warren G. Watts, 1 Little La., Westport, Conn. 06880

[21] Appl. No.: 550,787

[22] Filed: Nov. 14, 1983

Related U.S. Application Data

[60] Continuation-in-part of Ser. No. 431,118, Sep. 30, 1982, abandoned, which is a division of Ser. No. 291,411, Aug. 10, 1981, Pat. No. 4,370,792.

[51] Int. Cl.[4] .............................................. B23Q 17/00

[52] U.S. Cl. ........................................ 29/407; 29/448; 29/451; 24/462; 160/392

[58] Field of Search ......................... 29/407, 448, 451; 160/392; 24/462, 335, 458

[56] References Cited

U.S. PATENT DOCUMENTS

| | | | |
|---|---|---|---|
| 2,638,131 | 5/1953 | Rohs | 29/451 UX |
| 2,797,750 | 7/1957 | Van Dette | 160/392 |
| 2,897,889 | 8/1959 | Kessler | 160/392 |
| 2,950,727 | 8/1960 | Dunn | 24/458 X |
| 3,187,801 | 6/1965 | Saling | 160/392 |
| 3,371,702 | 3/1968 | Keegan et al. | 160/392 |
| 3,505,725 | 4/1970 | Curry | 29/451 |
| 4,152,033 | 1/1979 | Ohlmeyer et al. | 24/462 X |
| 4,337,815 | 7/1982 | Lindstrom | 160/392 |
| 4,341,255 | 7/1982 | Mock | 24/462 |

FOREIGN PATENT DOCUMENTS

| | | | |
|---|---|---|---|
| 805953 | 6/1951 | Fed. Rep. of Germany | 24/262 |
| 1165725 | 10/1969 | United Kingdom | 29/448 |

*Primary Examiner*—Charlie T. Moon

[57] ABSTRACT

The method and apparatus for holding tensile sheet materials for covering a surface. The device comprises a two-part track adapted to be mounted on a surface to be covered; a first part of each track having one longitudinal slot. The slot has a pair of confronting side walls which are ridged. Elastic splines are inserted into the slot over the sheet material. The spline and ridged slot frictionally hold the sheet material in a tension position; and a second L-shaped second part which is parallel to said first track. The sheet material is adapted to be pulled over the edge of the edge of the L-shaped second part so that a hairline flat seam in the tensile sheet material is formed.

4 Claims, 7 Drawing Figures

METHOD OF COVERING SURFACES WITH TENSILE SHEET MATERIALS

BACKGROUND OF THE INVENTION

This is a continuation-in-part application of U.S. patent application, Ser. No. 431,118 filed Sept. 30, 1982, now abandoned. U.S. patent application Ser. No. 431,118 is a division of U.S. patent application Ser. No. 291,411 filed Aug. 10, 1981. U.S. patent application Ser. No. 291,411 has matured, on Feb. 1, 1983, into U.S. Pat. No. 4,370,792.

The present invention relates to frames to which tensile sheet material may be attached and a method of attaching the same but more particularly to a method and apparatus for attaching tensile sheet material so that the material will be taut and afford a flat appearance.

It has become common practice to attach tensile sheet material to a frame, which has been previously attached to a surface such as a wall or ceiling. This is accomplished either for decorative purposes, as a paneled effect can be achieved, or to hide imperfections in the surface of the wall sought to be covered. It is also useful in an attempt to conserve energy as it can form an extra layer of insulation. The material may also cover an existing layer of insulation.

In U.S. Pat. No. 3,068,939 and British Pat. No. 1,165,725 a male and female member hold the tensile sheet material in position by friction, with the male and female member being of substantially the same size and shape.

However, the frames of the state of the art have a major drawback. The drawback is that as the tensile sheet material is being attached to the frame, the material may ripple, create waves, or create other visually unacceptable features due to the inherent stretch of the tensile sheet material as it is being attached to the frames. As the depth of the female member of these frames is equal only to the depth of the male member, there has been no practical way to adjust the tensile sheet material between the frame so that it is progressively and uniformly tightened to provide a completely taut appearance.

SUMMARY OF INVENTION

Accordingly, it is an object of the present invention to provide a method and apparatus for attaching tensile sheet material to a frame which allows the installed tensile material to give a taut flat appearance.

It is another object of the present invention to provide a method and apparatus for attaching tensile sheet material to a frame which affords the ability to remove the material from the frame if necessary and allowing access to the underlying surface.

It is another object of the present invention to provide a method and apparatus for attaching tensile sheet material to a frame such that the frame puts no restriction on the type of tensile sheet material that can be utilized.

It is yet still yet another object of the present invention to provide a method and apparatus for attaching tensile sheet material to a frame containing a frame made out of a suitable material such as plastic or aluminum having one rectilinear shaped slots with a plurality of parallel longitudinal ridges along the side walls of the slot.

It is yet still another object of the present invention to provide a method and apparatus for attaching a tensile sheet material to a frame such that the tensile sheet material is attached to the track by a compressible spline with the depth of the slot being approximately three times the diameter of the spline.

It is yet still another object of the present invention is to provide a method and appratus for attaching a tensile sheet material to a frame such that the spline is not visible when set to the bottom of the slot and also allowing the excess material to be trimmed.

Briefly, there are provided tracks which have longitudinal slots with a plurality of parallel longitudinal ridges in the slots, the size of which permitting the tensile sheet material to be installed so that it is taut, giving a flat appearance. The material can be removed from the frame, permitting access to the underlying surface. Also, the frame puts no restriction on the type of material which can be used. The only restrictions will be those of esthetics and the flammability of the material. The invention consists of using tracks, made of a suitable material such as aluminum or plastic, which has one longitudinal rectilinearly shaped slot, with a plurality of parallel longitudinal ridges along the side walls of each slot. The tensile sheet material is attached to the track by a compressible spline, with the depth of the slot being approximately three times the diameter of the spline. After the tracks have been attached to the surface which is to be covered, with the distance between the tracks a little less than the width of the material, one edge of the material and a spline are inserted into a slot by a special tool, so that the spline is level with the face of the track. The material and spline are then set halfway to the bottom of the slot with a special tool. The spline and material are then set all the way to the bottom with a special tool. Each step is done first to one edge of the material and then repeated with the opposite edge before proceeding onto the next step. This results in the material being completely stretched between the tracks of the frame. Also, due to the depth of the slot and the orientation of the track, the spline is not visible when set to the bottom of the slot. The excess material is then trimmed. Another strip of material of the same type already positioned on the frame is attached to the already positioned material and the spline is set in each slot of the tracks to a depth flush with the bottom face of the track, so that only an unbroken stretch of material is seen, with neither the edges of the material in the slot, the spline, nor the face of the track visible. The track slot depth is approximately three times the spline diameter in order to assure adequate gripping of the second layer of fabric and the second spline, and to still allow a few ridges near the opening to serve as knife-point guides for trimming the waste fabric. Also a small bead is added, around which the fabric is pulled. This is important so that there is a minimum of structure directly behind the fabric which might "read through". The track is dimensioned to exactly align with the matching "L" shaped angle around which the adjoining piece of fabric is stretched. Finally, the location of the flange of the track is changed so that attachment can be made, using screws through the flange. The method for attachment of the tensile sheet material of this invention is progressive. Each successive piece of fabric being applied only after the adjoining one has been completed. The progressive method allows putting up one piece at a time and therefore removing one piece at a time, reversing the installation process, if necessary to gain access to the covered wall.

BRIEF DESCRIPTION OF THE DRAWINGS

Further features and advantages of the invention become clear from the following description and drawings.

DETAILED DESCRIPTION OF THE PREFERRED EMBODIMENT

Figure 1:
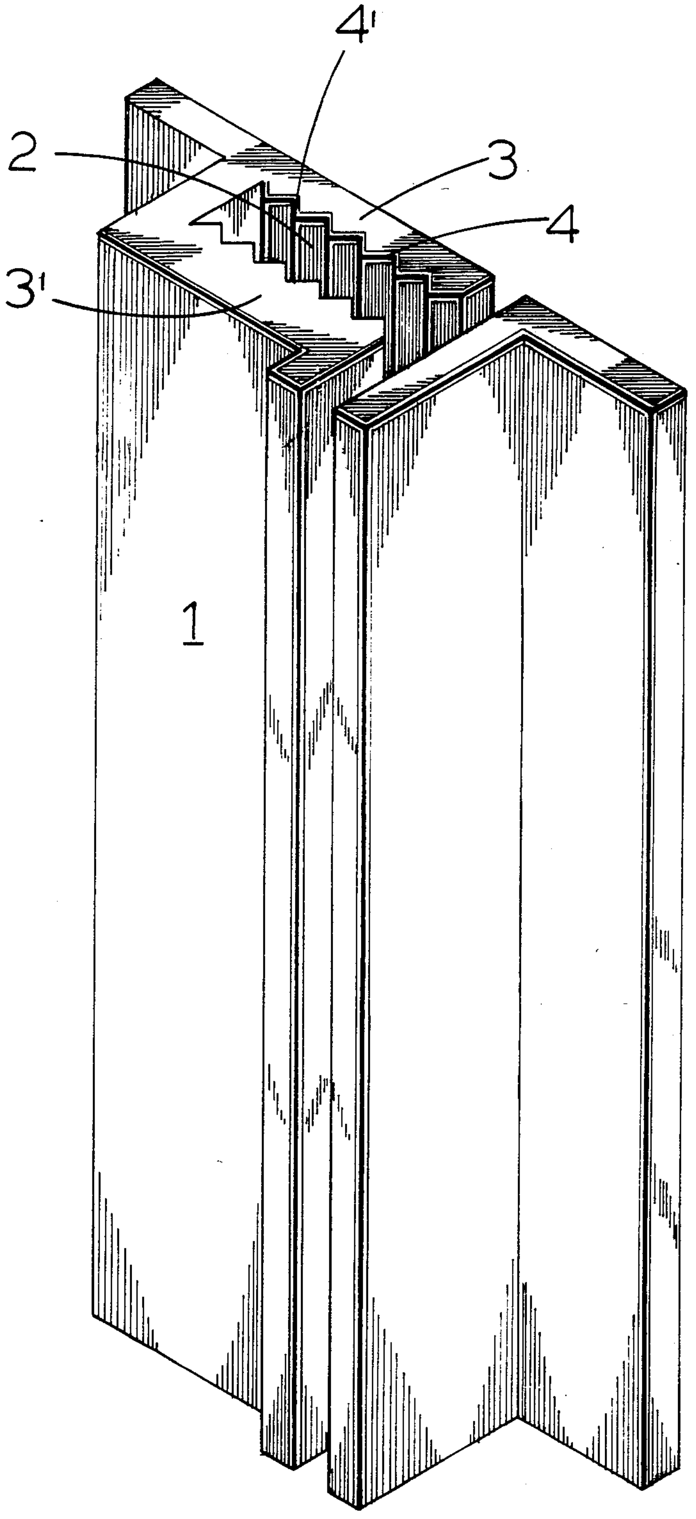
FIG. 1 is a perspective view of the track utilized to make the frame.
Figure 2:
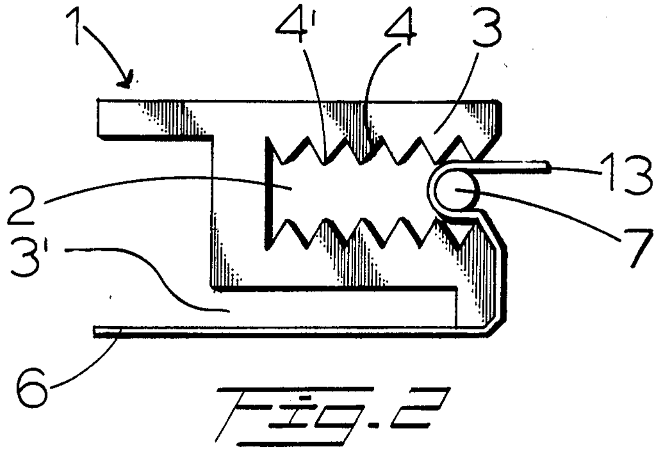
FIG. 2 is an end view of the track of FIG. 1 with a spline in the slot of the track, flush with the face of the track, holding a piece of material.
Figure 3:
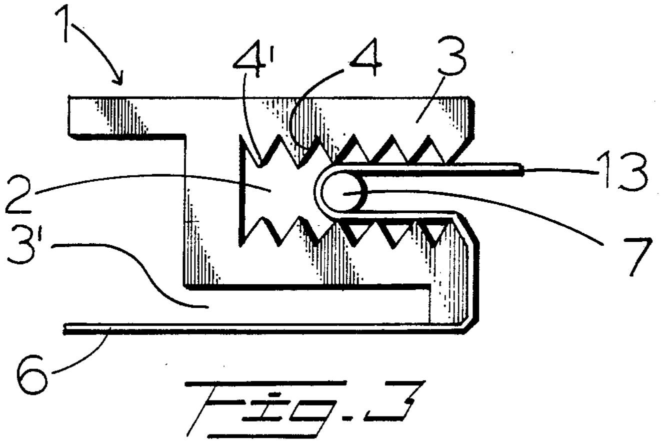
FIG. 3 is an end view of the track of FIG. 2 with a spline in the slot which has been moved halfway to the bottom, holding a piece of material.

Referring now to FIG. 1, the track of the present invention is shown generally at 1, which is preferably made from a lightweight material such as extruded aluminum or plastic having one rectilinear longitudinal slot 2. Each side wall 3 and 3' respectively of the slot 2 have a plurality of parallel longitudinal ridges 4. The depth of the slot 2 is approximately three times the distance between the innermost edges 4', of the ridges 4, of the opposing side walls 3 and 3' respectively.

After the track 1 has been attached to the surface to be covered, generally in a rectangular configuration, the first sheet of material 6 is cut to a width slightly greater than that which separates the tracks 1 to which the material 6 is to be attached. A line is marked on the material 6 near the edge 13 of the material 6 and parallel to the edge 13. The midpoint of the longitudinal extent of the described line is aligned with the midpoint of the longitudinal extent of the slot 2 and attached to the slot 2 by the spline 7. The spline 7, preferably made of a plastic tubular material is compressible and has a circular cross section. The diameter of spline 7 is such that the depth of the slot 2 is approximately three times greater than the diameter. Such splines are, for example, manufactured by the Ansan Manufacturing Co. under SRB 130.

Figure 4:
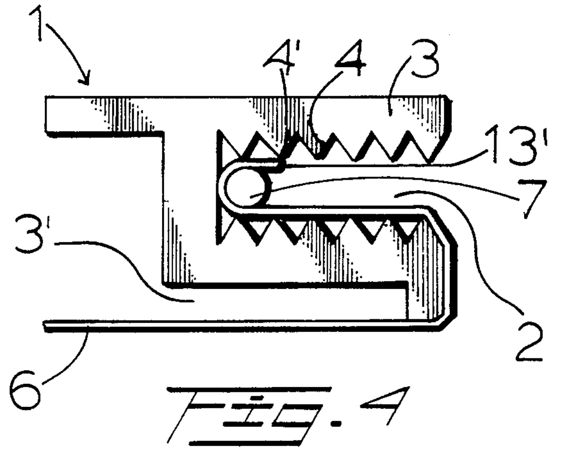
FIG. 4 is an end view of the track of FIG. 3 with the spline in the slot which has been moved all the way to the bottom of the slot, holding a piece of material.

After the midpoint has been aligned and attached, the edge 13 of the material 6 on which the line has been drawn is attached manually or by means of special tool as disclosed in my copending application Ser. No. 431,118, filed on Sept. 30, 1982, to the track 1 by the spline 7 at predetermined intervals, to facilitate further installation. Then starting at the midpoint and working toward one end of the track 1, a line drawn on the material 6 is aligned with the center line of the slot 2, and the spline 7 is rolled into the slot 2 over the line using the concave wheel of the special tool. When the spline 7 is set in the slot 2 by the concave wheel, it is set flush with a face 5 of the track 1. After the end of the track 1 is reached, the process is then repeated commencing at the midpoint and working to the other end of the track 1. The spline 7 is then positioned as shown in FIG. 4. The material 6 as shown in FIG. 4 has its edge 13' trimmed and edge 13 is now designated by 13'.

Figure 5:
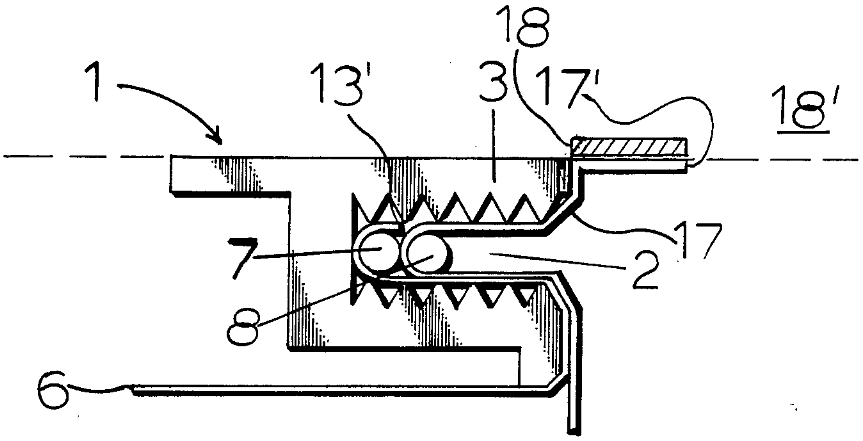
FIG. 5 is an end view of the track of FIG. 4 showing a piece of adhesive tape attached to the frame to hold the second tensile sheet material while the spline is being inserted.
Figure 6:
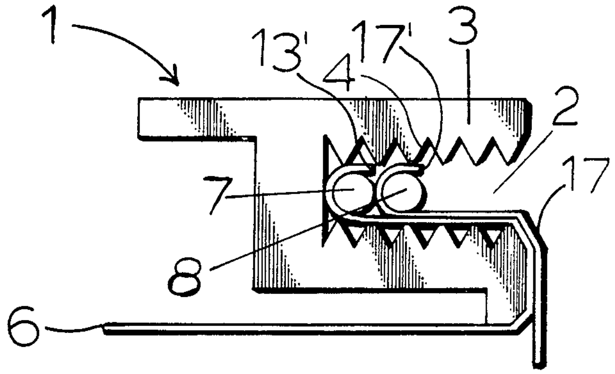
FIG. 6 is an end view of the track of FIG. 5 where the excess material of the second tensile material has been trimmed.
Figure 7:
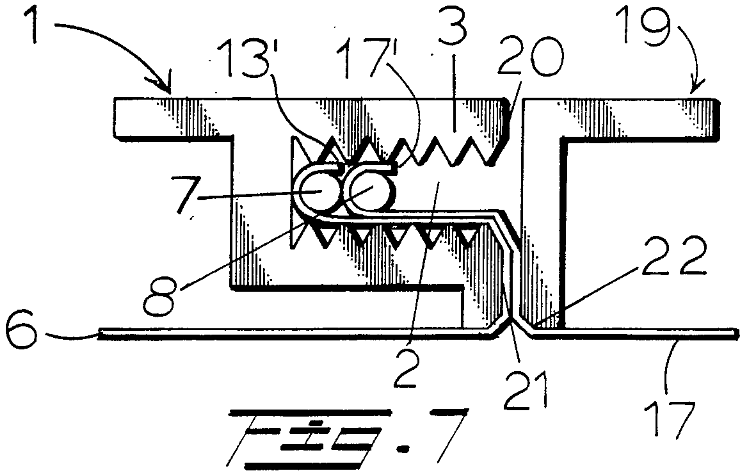
FIG. 7 is an end view of the track of FIG. 6 showing its completed position whereby an "L" shaped angle is attached adjacent to the track member and sandwiching the two tensile sheet materials.

The first edge of the second panel 17 is set as shown in FIG. 5. The face side of the fabric is laid against the face side of the first position panel 6. The thread alignment of the second edge 13' of the first panel 6 is accurately and visually set as spline 7 was inserted, however an additional step is required to assure that the thread is in alignment on the first edge 17' of the second panel 17. A pencil line is applied about one half an inch from the edge 17' of the fabric 17 but on the back side of the fabric 17. The pencil line is aligned with the edge of an applied strip of one half inch double stick tape 18 which has been mounted on wall 18' as shown in FIG. 5 Once aligned to the edge of the track and the tape 18, the fabric 17 is pressed on the tape 18 and is temporarily held in place by the two-sided tape 18. The material 17 is rolled into slot 2 and the spline 8 is inserted. Thus, the fabric 17 is securely set into the same slot 2 and on top of fabric 6 of the adjoining panel. Referring now to FIG. 6, the waste material is now cut away with a knife inserted into one of the slot ridges 4. As this waste is adhered to the double stick tape 18, the tape is removed at the same time. Fabric 17 now has a trimmed end 17'. As shown in FIG. 7, an "L" shaped member 19 of matching depth to track 1 is set hard against both fabric 6 and fabric 17 and the edge 20 and 21 of track 1. This configuration securely binds the seams in alignment. The second fabric 17 is then pulled around the front face 22 of the angle 19 and held in place by subsequent panel tracks.

Although the invention is described and illustrated with reference to a single embodiment thereof, it is to be expressly understood that it is in no way limited to the disclosure of such preferred embodiment but is capable of numerous modifications within the scope of the appended claims.

I claim:

1. A method for covering a surface with a tensile sheet material comprising the steps of:

(a) attaching a first part of a two-part frame to the surface to be covered, said first part of the two-part frame being made to tracks having one longitudinal slot with a pair of confronting longitudinally ridge side walls;

(b) cutting a first material to a width slightly greater than the distance separating consecutive tracks plus twice the depth of said slot;

(c) inserting one edge of said first material and an elastic spline placed over said material into said slot, so that the spline is substantially flush with the face of said track, said slot being perpendicular to the surface being covered;

(d) inserting the opposite edge of said first material into a slot of an opposite track with an elastic spline over said first material so that the spline is substantially flush with the face of said opposite track, said slot being perpendicular to the surface being covered;

(e) setting said spline and said first material halfway to the bottom of said slot for one edge and then repeating it for the other edge of said first material;

(f) setting said first spline and said first material all the way to the bottom of said slot for one of said edges and then repeating it for the other said edge so that said first material is stretched completely taut between said tracks and having said edge invisibly concealed;

(g) setting a face side of a second material against the face side of said first material;

(h) applying a strip of double stick tape to a wall surface adjacent to the track which is mounted on said wall, the wall being parallel to the surface being covered;

(i) applying a pencil line about one half of an inch from the edge of the second material of said second fabric but on the back side of said second fabric;

(j) aligning said line to the edge of said previously applied strip of double stick tape which is parallel and contiguous to said wall;

(k) pressing a second fabric on said tape and holding it temporarily in place while said second fabric is rolled into said slot and inserting a second spline so that said second layer of fabric is securely set into said first slot and on top of said first fabric of said first fabric;

(l) cutting away the waste material of said second fabric with a knife inserted into one of said slot ridges;

(m) removing said waste material in conjunction with said double stick tape;

(n) securing a second track part of said frame; said second part having an "L" shaped cross-section of matching depth to said first part of said frame adjacent said first and second fabrics of said first part of said track frame, so that said seam is held in alignment and securely binded;

(o) pulling said second fabric panel around said "L" shaped second track part and securing it to the next progressive first part track frame for consecutive panel so that a plain seam is produced.

2. A method for covering a surface with a tensile sheet material as claimed in claim 1 wherein said longitudinal slot of said track is rectilinear.

3. A method for covering a surface with a tensile sheet material as claimed in claim 2 wherein each said first part of each said track has said slot lying in a plane parallel to said surface to be covered.

4. A method for covering a surface with a tensile sheet material as claimed in claim 8 wherein the depth of said slot is approximately three times greater than said distance between the ridges on said confronting side walls.

* * * * *